April 5, 1927.
S. F. BRIGGS ET AL
OIL GAUGE
Filed March 8, 1920    2 Sheets-Sheet 1
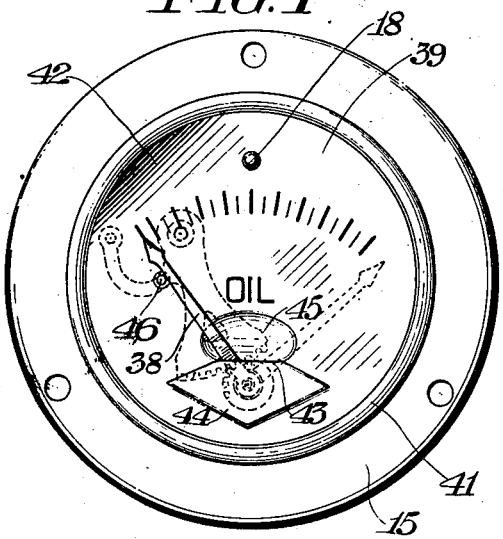
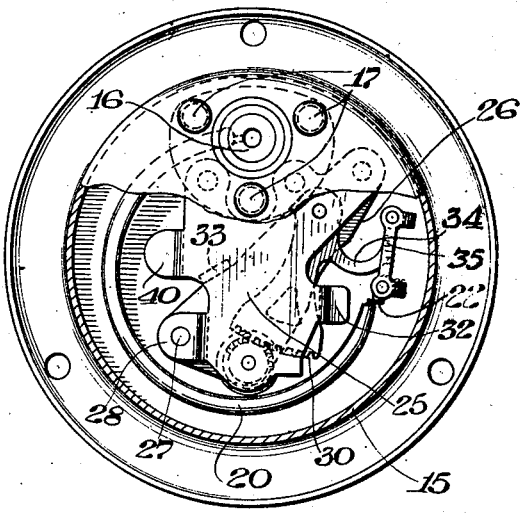
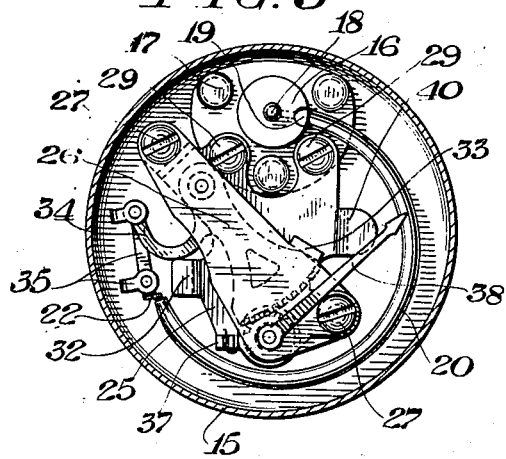
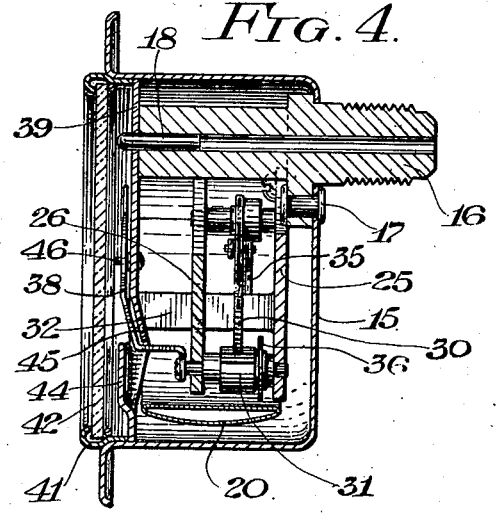
WITNESSES
INVENTORS
Stephen F. Briggs &
Edward A. Jacobi
By R. S. C. Caldwell
ATTORNEY April 5, 1927.
S. F. BRIGGS ET AL
1,623,333
OIL GAUGE
Filed March 8, 1920
2 Sheets-Sheet 2
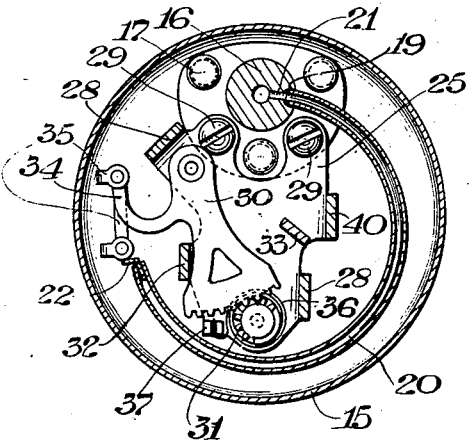
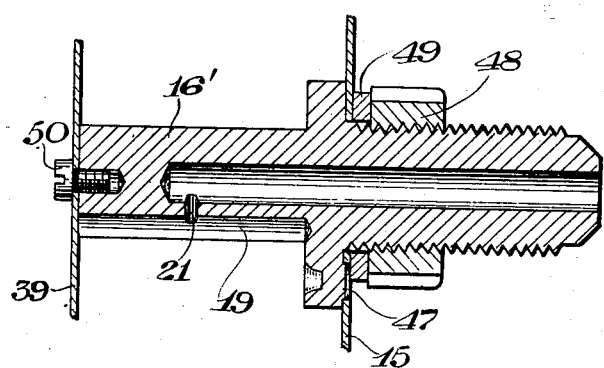
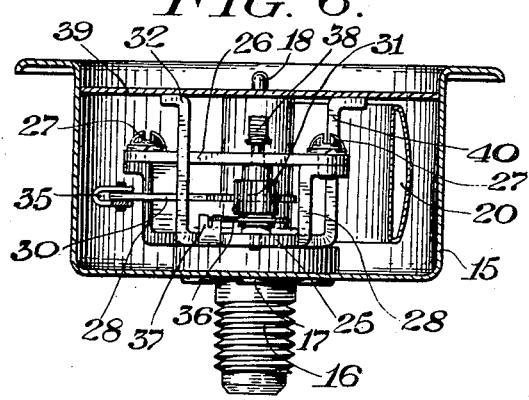
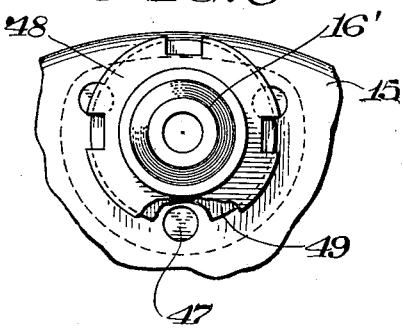
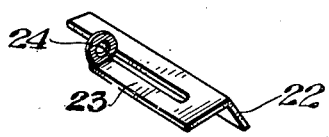
WITNESSES.
INVENTORS
Stephen F. Briggs &
Edward N. Jacobi
By R. S. Caldwell
ATTORNEY Patented Apr. 5, 1927.

1,623,333

UNITED STATES PATENT OFFICE.

STEPHEN F. BRIGGS AND EDWARD N. JACOBI, OF MILWAUKEE, WISCONSIN, ASSIGNORS, BY MESNE ASSIGNMENTS, TO BRIGGS & STRATTON CORPORATION, OF MILWAUKEE, WISCONSIN, A CORPORATION OF DELAWARE.

OIL GAUGE.

Application filed March 8, 1920. Serial No. 363,943.

This invention relates to an oil gauge of the expanding tube or Bourdon type and has for its object to simplify the construction thereof, making it less expensive to manufacture and more easily assembled and adjusted.

Another object of the invention is to provide a gauge of this type or any other gauge or measuring instrument with a dial plate with a slot through which the gauge hand or indicator passes, said slot having one side thereof depressed or the other side embossed, or both, for the purpose of giving sufficient clearance for the hand and without marring the appearance of the dial plate.

With the above and other objects in view the invention consists in the oil gauge as herein claimed and all equivalents.

Referring to the accompanying drawings in which like characters of reference indicate the same parts in different views:

Fig. 1 is a front view of an oil guage constructed in accordance with this invention;

Fig. 2 is a rear view thereof with the case broken away to show the interior;

Fig. 3 is a front view with the case sectioned and the dial plate and front parts removed;

Fig. 4 is a sectional view on a vertical plane;

Fig. 5 is a view similar to Fig. 3 but with further parts removed;

Fig. 6 is a horizontal sectional view;

Fig. 7 is an enlarged sectional view of a modified form of nozzle;

Fig. 8 is a rear view thereof with a part broken away;

Fig. 9 is a perspective view of the link and tube connector; and

Fig. 10 is a view of the connecting link.

In these drawings 15 indicates a cup-shaped case with an outwardly extending attaching flange at the front. Passing through an opening in the back of the case is a nozzle 16 held in position by means of rivets 17 through its flange and the back wall of the case. This nozzle is threaded or otherwise formed at its rear end to constitute a pipe connection for a tube of the oiling system with which the gauge is to be used, ordinarily the oiling system of an automobile engine. The bore through the nozzle may be closed at the front end by means of a pin or plug 18, which may be allowed to protrude beyond the end of the nozzle for the purpose that will later appear.

The side of the nozzle has a groove 19 to receive a flattened curved tube 20 of thin metal known as a Bourdon tube. The end of the tube is fitted in the groove 19 of the nozzle and soldered thereto though the interior of the tube connects with the bore of the nozzle through an opening 21, so that the pressure in the lubricating system is communicated to the Bourdon tube.

The other end of the Bourdon tube is closed by having an angularly bent strip of sheet metal 22 soldered therein and this end is unconfined and free to move with the variations in pressure in the lubricating system. An arm 23 Fig. 9 on the strip 22 is adapted to be bent as desired to change the position of the connecting eye 24 at its end and so adjust the hand to the zero point when the instrument is assembled, as will be later described.

The mechanism for translating the movements of the free end of the Bourdon tube into a swinging movement of an index hand in front of a dial is mounted in a frame removably secured to the nozzle. This frame consists of a frame member 25 and a top plate 26 secured thereto and spaced therefrom by screws 27 passing through its ends and threaded into upturned spacing arms 28 of said frame member. As shown in Figs. 3 and 5, the frame member is provided with a pair of ears through which screws 29 pass and are threaded into the flange of the nozzle for rigidly holding the frame in place, though permitting it to be detached. The transmission gearing consists of a segment gear 30 meshing with a pinion 31, both of which are carried on staffs mounted in and between the frame member and its top plate.

The segment gear 30 may play between stops 32 and 33, the former of which is bent up from the frame member 25 and the latter is bent down from the top plate 26.

The segment gear 30 is provided with a bendable arm 34 which is connected by means of a link 35 with the free end of the Bourdon tube, so that the movements of the Bourdon tube incident to the variations in the pressure in the lubricating system will cause the segment gear to swing and turn the pinion. This link 35 consists of a U-shaped strip of sheet metal with its ends bent over and forming eyes registering with eyes in the corners and the registering eyes at each end of the link form double bearings to receive between them the eye on the end of the arm 34 of the segment gear and the eye 24 on the end of the Bourdon tube respectively. Rivets forming pivot pins connect these parts together.

As shown, the pinion 31 is provided with teeth only where they will be engaged by the teeth of the segment gear.

Secured to the pinion staff is a hair spring 36 with its outer end connected to the frame by being pinched within a slot of a lug 37 thereof and this spring serves to turn the pinion and the other parts to their normal positions.

On the end of the pinion staff is secured a hand 38 which is bent forwardly and upwardly and indicates on a scale of a dial plate 39 the changes in expansion or contraction of the Bourdon tube incident to the changes in pressure in the lubricating system. The dial plate 39 bears against the end of the nozzle 16 and also against the end of arm 32 and another arm 40 bent up from the edge of the frame member 25. The position of the dial plate is determined by the projecting end of the plug 18, previously referred to, passing through an opening therein, as clearly seen in Figure 4. The dial plate is held in place against its supports by a bezel ring 41 which has a tight fit within the case 15 and carries a glass cover disk 42.

Instead of the pinion staff passing through an opening in the dial plate or the hand passing through an arc-shaped slot, the dial plate is slit along a straight line 43 Fig. 1 and an area just beneath the slit is embossed to form a raised portion 44 while an area just above the slit is depressed to form an inclined portion 45, as will be seen in Figures 1 and 4. This enables the hand to play through an opening in the dial plate without such opening being visible when the instrument is viewed from the front. A hand stop 46 consisting of a pin riveted in the dial plate serves as a means engaged by the hand when it is in the zero position and against which it is held by the action of the spring. In operation the pressure of the lubricating system is communicated to the Bourdon tube directly from the bore of the straight nozzle and serves by expanding said tube to cause its free end to move and such movements are communicated to the hand through the link and gearing connection so that the hand is moved over the dial, thus indicating by its position on the dial the degree of the pressure.

By positioning the nozzle near the edge of the case the Bourdon tube may be connected directly thereto, thus simplifying the construction and reducing the cost of manufacture. The nozzle with its Bourdon tube may be secured in the case and then the frame with its parts is attached to the nozzle flange by means of the screws 29. The link 35 which may have been attached to either the Bourdon tube or the segment gear is then connected with the other, which may be done without difficulty through the open front of the case.

By bending the arm 23 the hand may be brought to the zero or normal position. Then with the nozzle connected up with a means for supplying it with the maximum pressure for which the gauge is designed, the arm 34 may be bent nearer to or farther from the staff of the segment gear to vary the range of movement of the hand to correspond with the scale on the dial and these adjustments are repeated until both zero position and proper range are obtained.

On account of the manner of forming the opening in the dial plate, the dial plate may be slipped into position, receiving the hand through said opening, and when it is seated on its supports and positioned on the projecting plug 18 the bezel with the glass is fitted in the end of the case and against the dial plate to securely hold it against its support.

The oil gauge of this invention is extremely simple in its construction and inexpensive to manufacture and assemble and because of its simplicity it is durable and not likely to get out of order.

It is obvious that changes may be made without departure from the invention, as, for instance, the nozzle instead of being riveted to the case may be clamped in the manner shown in Figures 7 and 8. In these figures the nozzle 16' has bosses or dowels 47 swaged or otherwise formed on the face of its flange and these dowels fit within openings in the back of the case to prevent the nozzle from turning, a nut 48 being threaded on the end of the nozzle with a spring washer 49 to hold it and serving to clamp the nozzle to the case. It is preferred to use a special nut for this purpose requiring a spanner wrench in order to discourage tampering that would disturb the adjustment. In this form there is also shown another modification which consists in the bore of the nozzle extending only part way through the same and a screw 50 threaded in the end of the nozzle to take the place of the plug 18 in fixing the position of the dial plate 39.

What we claim as new and desire to secure by Letters Patent is:

1. In a pressure gauge, a gear frame comprising a frame member, arms bent up from the sides thereof, a top plate mounted on some of the arms at a distance from the frame member, an intermeshing segment gear and pinion on staffs mounted in and between the frame member and the top plate, a dial plate mounted on other arms at a greater distance from the frame member, and a hand on the pinion staff cooperating with the dial plate to indicate movements of the mechanism.

2. In a pressure gauge having a Bourdon tube, a strip of metal secured in the closed end of the Bourdon tube and bent longitudinally to form an angle, an arm cut from the angularly bent projecting portion of the metal strip, and an eye on the end of the arm adapted for connection with the indicating means, said arm being adapted to be bent to provide adjustment between the Bourdon tube and the indicating means.

3. In a pressure gauge, a Bourdon tube, an indicator gearing comprising a segment gear and pinion meshing therewith, an arm on the segment gear having an eye on its end, an eye on the end of the Bourdon tube, and a link connecting the two eyes and consisting of a strip of sheet metal with eyes at its ends and end extensions also containing eyes and bent to lie parallel with the first mentioned eyes of the link and receiving the eyes of the sector of the segment gear arm and of the Bourdon tube between them and pivotally connected therewith.

4. In a pressure gauge, a cup-shaped case, a nozzle secured therein and provided with a central bore, a Bourdon tube mounted on the nozzle and communicating with the bore, a plug fitting in the end of the bore and projecting from the nozzle, a dial plate fitting in the case and against the end of the nozzle with the projecting plug passing therethrough, a bezel ring fitting in the case against the dial plate, a glass cover carried thereby, and an indicating hand cooperating with the dial plate and operated by the Bourdon tube.

In testimony whereof, we affix our signatures.

STEPHEN F. BRIGGS.
EDWARD N. JACOBI.